US007931772B2

(12) United States Patent
Yoo et al.

(10) Patent No.: US 7,931,772 B2
(45) Date of Patent: Apr. 26, 2011

(54) METHOD FOR MANUFACTURING LIGHT EMITTING DISPLAYS AND LIGHT EMITTING DISPLAY DEVICE

(75) Inventors: Choong Keun Yoo, Incheon (KR); In Sun Yoo, Incheon (KR); Kang Ju Lee, Ansan-si (KR)

(73) Assignee: LG Display Co., Ltd., Seoul (KR)

( * ) Notice: Subject to any disclaimer, the term of this patent is extended or adjusted under 35 U.S.C. 154(b) by 649 days.

(21) Appl. No.: 11/984,690

(22) Filed: Nov. 20, 2007

(65) Prior Publication Data

US 2008/0157651 A1 Jul. 3, 2008

(30) Foreign Application Priority Data

Dec. 29, 2006 (KR) ........................ 10-2006-0137643

(51) Int. Cl.
*B29C 65/00* (2006.01)

(52) U.S. Cl. ............. 156/285; 349/187; 445/24; 445/25

(58) Field of Classification Search .................. 156/285, 156/286, 381, 382; 349/187; 445/24, 25
See application file for complete search history.

(56) References Cited

U.S. PATENT DOCUMENTS

| | | | | |
|---|---|---|---|---|
| 5,263,888 | A * | 11/1993 | Ishihara et al. | 445/25 |
| 2003/0145943 | A1 * | 8/2003 | Lee et al. | 156/285 |
| 2005/0167036 | A1 * | 8/2005 | Yokoyama et al. | 156/230 |
| 2005/0275791 | A1 * | 12/2005 | Chen et al. | 349/190 |

* cited by examiner

*Primary Examiner* — Richard Crispino
*Assistant Examiner* — Christopher Schatz
(74) *Attorney, Agent, or Firm* — McKenna Long & Aldridge LLP

(57) ABSTRACT

A method for manufacturing light emitting devices is provided. The method may reduce the inner pressure of a laminated image emitting device panel, thereby preventing failure of the panel. The method includes holding a first substrate with a lower chuck located in a vacuum chamber; holding a second substrate with an upper chuck located opposite the first chuck in the vacuum chamber; creating a high vacuum in the vacuum chamber; correcting positions of the first substrate and the second substrate; supplying gas having a temperature of about 50 to about 200° C. into the vacuum chamber; temporarily laminating the first substrate and the second substrate; venting the vacuum chamber; and bonding the first substrate and the second substrate. The panel is laminated after being filled with a heated gas and thus, when it is exposed to room temperature, the mobility of the gas decreases while reducing its initial inner pressure, thereby preventing panel failure.

8 Claims, 6 Drawing Sheets

METHOD FOR MANUFACTURING LIGHT EMITTING DISPLAYS AND LIGHT EMITTING DISPLAY DEVICE

This application claims the benefit of Korean Patent Application No. 10-2006-137643, filed on Dec. 29, 2006, which is hereby incorporated by reference for all purposes as if fully set forth herein.

BACKGROUND OF THE INVENTION

1. Field of the Invention

The present invention relates to a light emitting device, and more particularly, to a method for manufacturing light emitting devices. The method may reduce the inner pressure of a laminated image emitting device panel to prevent failure of the panel.

2. Discussion of the Related Art

Thin light emitting devices for use as information display devices have recently gained popularity. These light emitting devices may be as thin as a sheet of paper. The light emitting device itself may be a self-emission device that uses a thin light emitting layer between electrodes. The device has many advantages, such as low power consumption, thinness, and self-emission.

Light emitting devices include pixels arranged in a matrix to display an image. Each sub-pixel may include a light emitting cell and a drive portion that independently drives the light emitting cell.

The light emitting cell may include a pixel electrode connected to the drive portion, a common cathode connected to ground, and a light emitting element formed between the pixel electrode and the common cathode.

The drive portion may include a storage capacitor and two transistors connected between a power supply line, a data line, and a gate line. The drive portion drives the pixel electrode of the light emitting cell. The power supply line may provide common drive power, the data line may provide a video data signal, and the gate line may provide a scan signal.

Drive portions and light emitting portions may be formed to oppose each other on two substrates. The two substrates may be laminated together with a seal, thereby providing an encapsulation structure. This structure may be provided in a vacuum chamber. The drive portions drive the light emitting portions to emit light through the substrates.

If the substrates of the light emitting device are laminated using an inert gas at room temperature, the initial inner pressure between the upper substrate and lower substrate of the light emitting device including light emitting portions on the upper substrate and drive portions on the lower substrate as described above is about 30-40 torr.

However, the inner pressure of a related art light emitting device will increase to above 100 torr during reliability tests involving high temperature and high humidity. FIG. 1 illustrates a related art light emitting device which includes an upper substrate 1, a lower substrate 2, light emitting portions 4, drive portions 5, contact electrodes 6, and a seal 7. In edge portions of the upper substrate 1 and the lower substrate 2 where the seal 7 is formed, drive portions 5 are connected to light emitting portions 4 through contact electrodes 6. However, in middle portions of the upper substrate 1 and the lower substrate 2, contact electrodes 6 are not in contact with drive portions 5 due to the increased inner pressure. Thus, the light emitting device may fail to function.

SUMMARY OF THE INVENTION

Accordingly, the present invention is directed to a method for manufacturing light emitting devices and light emitting display devices that substantially obviate one or more problems due to limitations and disadvantages of the related art.

An advantage of the present invention is to provide a method for manufacturing light emitting devices and light emitting display devices that may reduce the inner pressure of a laminated image light emitting device panel, thereby preventing failure of the panel.

Additional features and advantages of the invention will be set forth in part in the description which follows, and in part will be apparent from the description, or may be learned by practice of the invention. These and other advantages of the invention will be realized and attained by the structure and method particularly pointed out in the written description and claims hereof as well as the appended drawings.

To achieve these and other advantages and in accordance with the purpose of the present invention, as embodied and broadly described, a method for manufacturing a light emitting device includes holding a first substrate with a lower chuck located in a vacuum chamber; holding a second substrate with an upper chuck located opposite the first chuck in the vacuum chamber; creating a high vacuum in the vacuum chamber; correcting positions of the first substrate and the second substrate; supplying gas having a temperature of about 50 to about 200° C. into the vacuum chamber; temporarily laminating the first substrate and the second substrate; venting the vacuum chamber; and bonding the first substrate and the second substrate.

In another aspect of the present invention, a light emitting device includes an upper substrate; a lower substrate; and a seal maintaining a vacuum between the upper substrate and the lower substrate, wherein a pressure of the vacuum between the upper substrate and the lower substrate is between about 20 to about 35 torr.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principles of the invention. In the drawings.

DETAILED DESCRIPTION OF THE ILLUSTRATED EMBODIMENTS

Reference will now be made in detail to embodiments of the present invention, examples of which are illustrated in the accompanying drawings. Wherever possible, the same reference numbers will be used throughout the drawings to refer to the same or similar parts.

Figure 1:
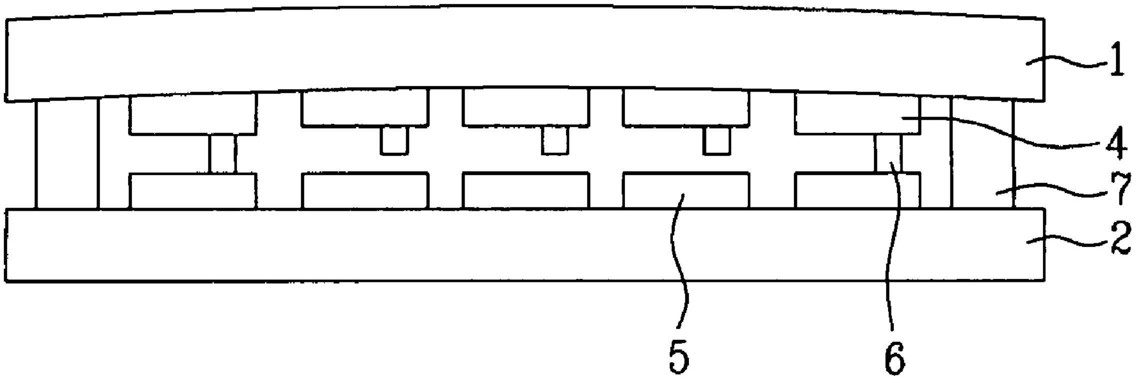
FIG. 1 Related Art
FIG. 1 is a sectional view illustrating a related art light emitting device.
Figure 2:
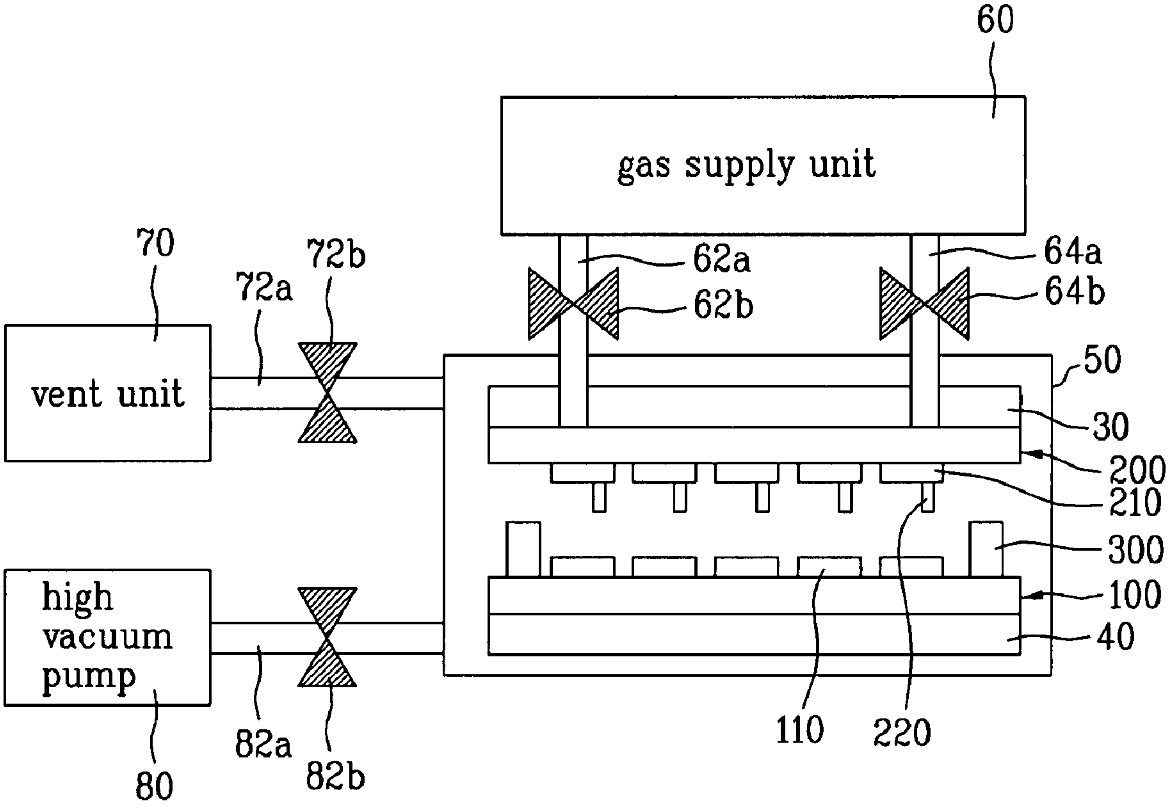
FIG. 2 schematically illustrates an apparatus for manufacturing light emitting devices according to an embodiment of the present invention.

FIG. 2 schematically illustrates an apparatus for manufacturing light emitting devices according to an embodiment of the present invention.

As shown in FIG. 2, the apparatus for manufacturing light emitting devices according to the embodiment of the present invention may include a vacuum chamber 50, a lower chuck 40, an upper chuck 30, a high vacuum pump 80, a gas supply unit 60, and a vent unit 70. The lower chuck 40 is provided within the vacuum chamber 50 and loads a first substrate 100 onto the lower chuck 40. The upper chuck 30 is provided within the vacuum chamber 50 opposite the lower chuck 40 and loads a second substrate 200 onto the upper chuck 30. The vacuum pump 80 creates a vacuum in the vacuum chamber 50. The gas supply unit 60 supplies a heated gas to the vacuum chamber 50 when the first substrate 100 and the second substrate 200 are temporarily laminated together. The vent unit 70 vents the interior of the vacuum chamber 50. That is, the vent unit 70 allows a vent gas to enter and/or exit the vacuum chamber 50.

The first substrate 100 may include an insulating substrate (not shown) and signal lines (not shown), drive portions 110 including thin film transistors, and a seal 300 formed on the insulating substrate.

The second substrate 200 may include contact electrodes 220 and light emitting portions 210. Contact electrodes 220 may be formed so as to contact drive portions 110. Each light emitting portion 210 may include a light emitting layer between first and second electrodes.

The vacuum chamber 50 includes the lower chuck 40 onto which the first substrate 100 is loaded and the upper chuck 30 onto which the second substrate 200 is loaded in order to laminate the first substrate 100 and the second substrate 200 together. In the process of temporarily laminating the first substrate 100 and the second substrate 200, the conditions of the vacuum chamber 50 include a high vacuum with an inner pressure of $1\times10^{-3}$ torr or less.

The upper chuck 30 is provided in the vacuum chamber 50 at an upper inner portion of the vacuum chamber 50 to hold the second substrate 200 loaded onto the upper chuck 30. The upper chuck 30 may include a holding device (not shown) to hold the second substrate 200 through a vacuum or electrostatic holding method. Here, the upper chuck 30 may include a holding releaser (not shown) to allow free fall of the second substrate 200 held by the upper chuck 30.

The lower chuck 40 is provided in the vacuum chamber 50 at a lower inner portion of the vacuum chamber opposite the upper chuck 30 to hold the first substrate 100 loaded onto the lower chuck 40. The lower chuck 40 may include a holding device (not shown) to hold the first substrate 100 through a vacuum or electrostatic holding method. Here, the lower chuck 40 may include a position aligner to align the positions of the first substrate 100 and the second substrate 200.

The high vacuum pump 80 may create a high vacuum in the vacuum chamber 50 by sucking air or gas from the vacuum chamber 50 through a high vacuum pump tube 82*a* so that the air or gas is discharged from the vacuum chamber 50. A first valve 82*b* that is opened and closed by a controller (not shown) is provided on the high vacuum pump tube 82*a*.

The gas supply unit 60 supplies a heated gas into the vacuum chamber 50 through a plurality of gas supply tubes. Gas supply tubes 62*a* and 64*a* illustrate the gas tubing, however, more than two gas supply tubes may be employed. The gas supply tubes 62*a* and 64*a* pass through an upper wall of the vacuum chamber 50 and may be connected to the upper chuck 30. The upper chuck 30 includes a plurality of gas supply holes connected to the plurality of gas supply tubes 62*a* and 64*a*. Thus, a heated gas from the gas supply unit 60 is supplied into the vacuum chamber 50 through the plurality of gas supply holes formed in the upper chuck 30. The heated gas may be an inert gas such as nitrogen ($N_2$) or argon (Ar) and is heated to a temperature of about 50° C. to about 200° C.

Gas valves 62*b* and 64*b* that are closed and opened by the controller are provided respectively on the gas supply tubes 62*a* and 64*a*.

The vent unit 70 vents the interior of the vacuum chamber 50 by supplying a vent gas into the vacuum chamber 50 through a vent tube 72*a* so that the temporarily laminated first substrate 100 and second substrate 200 are completely laminated together by the pressure difference between the inner pressure of the vacuum chamber 50 and the pressure of the gap between the first substrate 100 and the second substrate 200. That is, the vent unit 70 allows the interior of the vacuum chamber 50 to be brought into a lower vacuum state than the already-existing high vacuum state so that the laminated first substrate 100 and second substrate 200 are pressed against each other by the pressure difference.

A second valve 72*b* which is opened and closed by the controller is provided on the vent tube 72*a*.

Figure 3:
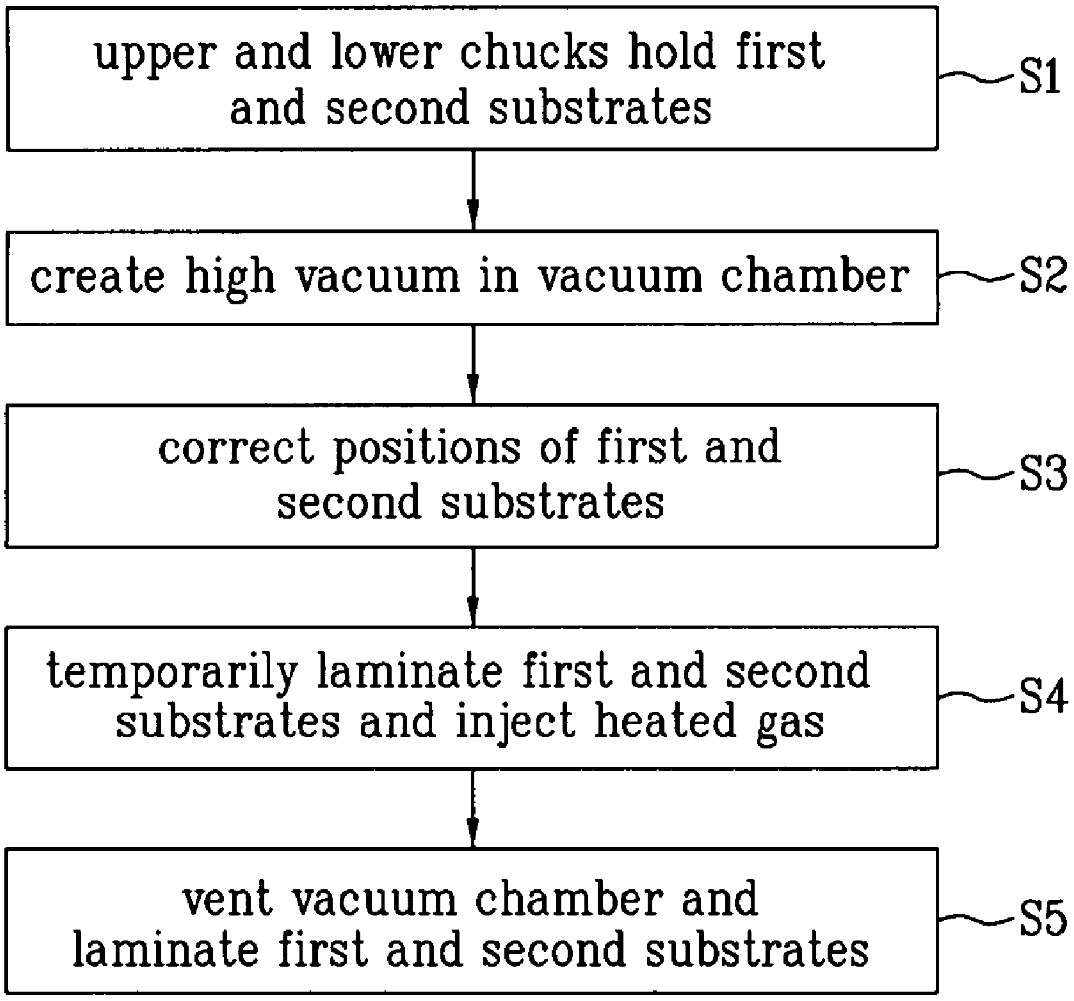
FIG. 3 is a flow chart illustrating a method for manufacturing light emitting devices according to an embodiment of the present invention.

FIG. 3 is a flow chart illustrating a method for manufacturing light emitting devices according to an embodiment of the present invention and FIGS. 4A to 4E are process diagrams illustrating the method for manufacturing light emitting devices according to an embodiment of the present invention.

Reference will now be made to the method for manufacturing light emitting devices according to an embodiment of the present invention with reference to FIG. 3 in conjunction with FIGS. 4A to 4E.

Figure 4A:
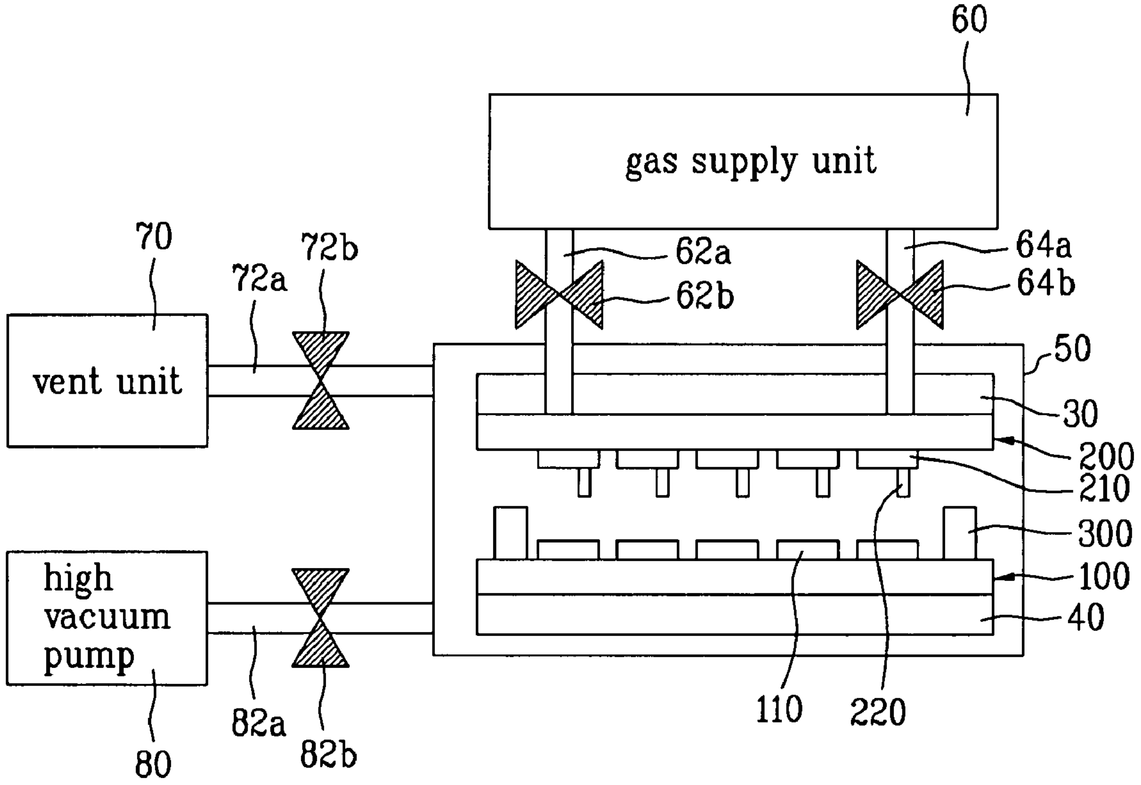
FIGS. 4A, 4B, 4C, 4D and 4E are process diagrams illustrating the method for manufacturing light emitting devices according to the embodiment of the present invention.

As shown in FIG. 4A, the first substrate 100 on which drive portions 110 have been formed is held to the lower chuck 40. Each drive portion 110 may include at least one transistor and at least one capacitor. The second substrate 200 on which light emitting portions 210 have been formed is then held to the upper chuck 30 (S1). Light emitting portions 210 are driven by drive portions 110 to emit light.

Figure 4B:
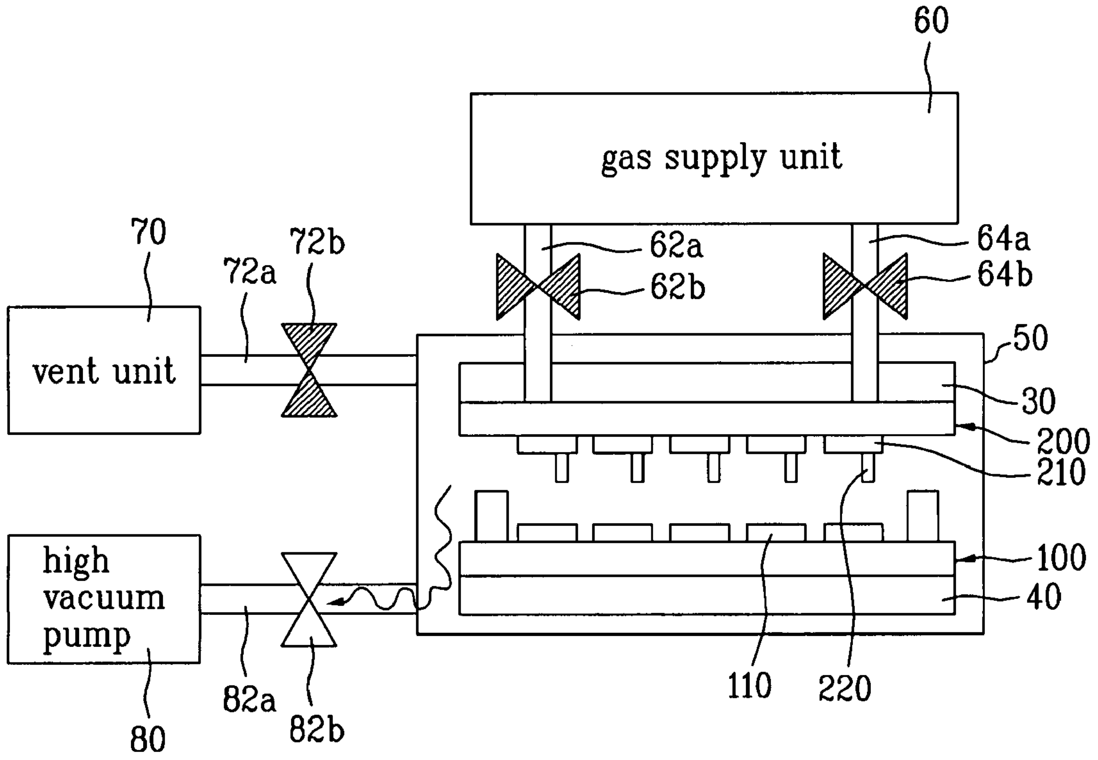

Then, as shown in FIG. 4B, the high vacuum valve 82*b* provided on the high vacuum pump tube 82*a* is opened to discharge gases from the vacuum chamber 50 to create a vacuum in the vacuum chamber 50. The vacuum chamber 50 and the high vacuum pump 80 are connected to each other through high vacuum pump tube 82*a*. This allows the vacuum chamber 50 to have an inner pressure less than $1\times10^{-3}$ torr, which is a high vacuum pressure, and to have an inner temperature in the range of about 50° C. to about 90° C. (S2).

Then, the positions of the first substrate 100 and the second substrate 200 held to the lower chuck 40 and the upper chuck 30 are corrected to align the first substrate 100 and the second substrate 200 (S3).

Figure 4C:
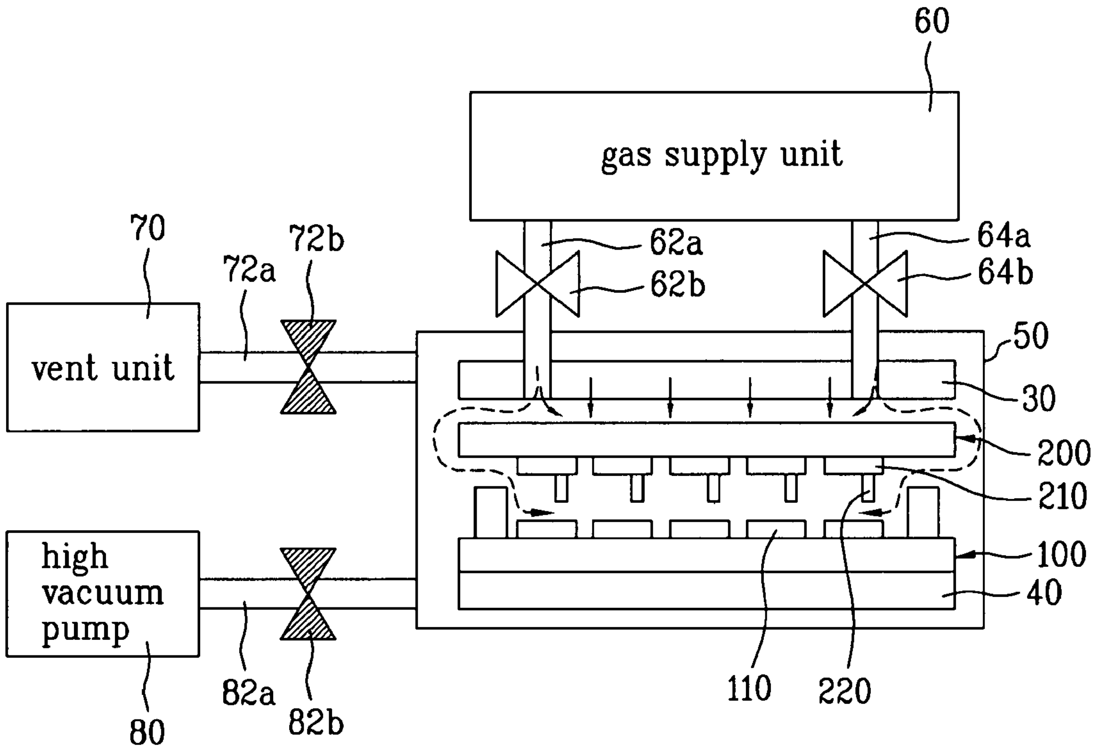

Then, as shown in FIG. 4C, the upper chuck 30 is moved down to position the second substrate 200 above the first substrate 100 aligned on the lower chuck 40 so there exists a constant gap between the second substrate 200 and the first substrate 100. Then, the sucking force of the upper chuck 30 is removed to allow the second substrate 200 to freely fall from the upper chuck 30 to the first substrate 100 to temporarily laminate the first substrate 100 and the second substrate 200. While the second substrate 200 is allowed to freely fall, the gas supply unit 60 supplies a heated gas into the vacuum chamber 50 through the gas supply tubes 62*a* and 64*a* so that the heated gas is introduced into the gap between the first and second substrates 100 and 200 (S4). The heated gas is supplied into the vacuum chamber 50 through gas supply holes formed in the upper chuck 30. The heated gas has a temperature in the range of about 50° C. to about 200° C.

Figure 4D:
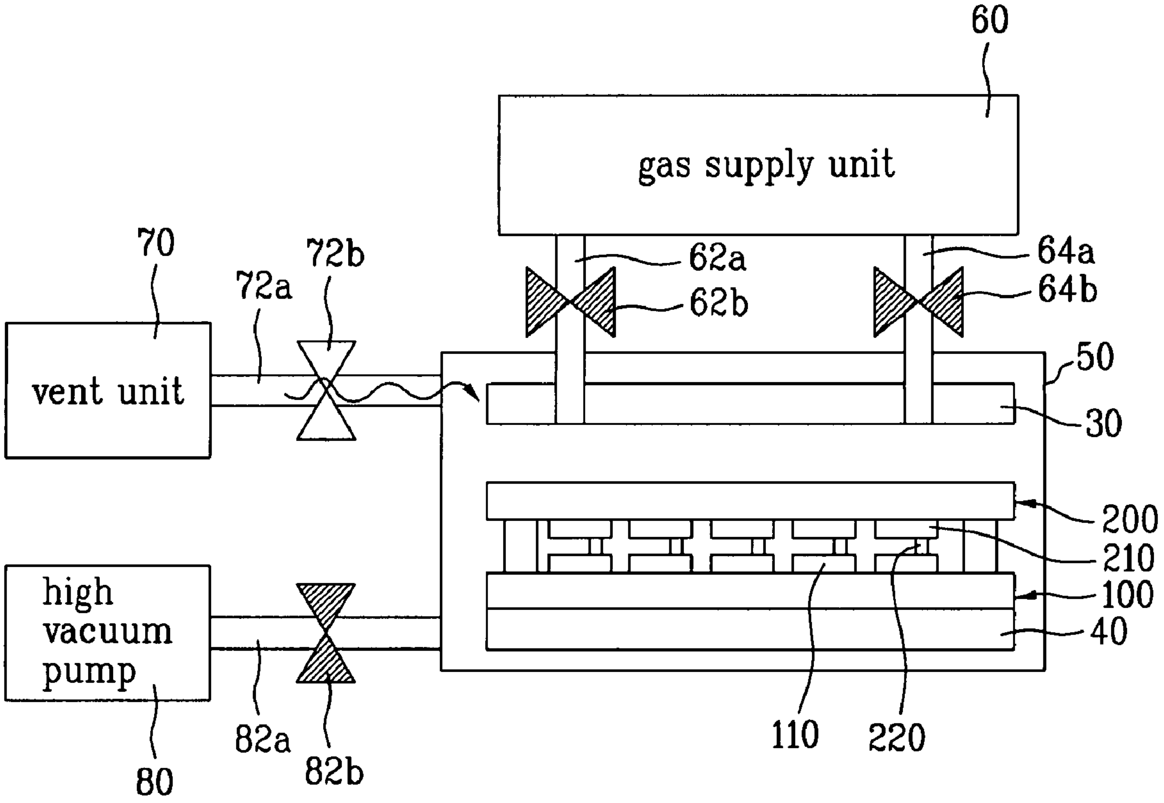
Figure 4E:
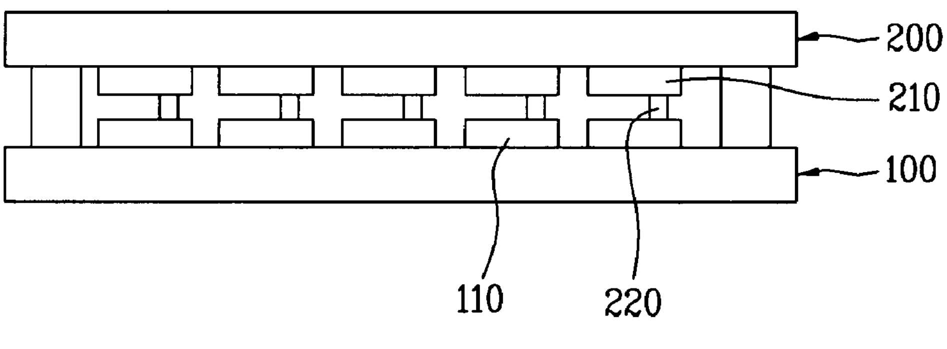

Then, as shown in FIG. 4D, in order to bond the temporarily laminated first substrate 100 and second substrate 200, the vent unit 70 vents the vacuum chamber 50 by supplying a vent gas into the vacuum chamber 50 through the vent tube 72*a*. Due to the pressure difference between the inner pressure of the vacuum chamber 50 and the pressure of the gap between the first substrate 100 and the second substrate 200, the first and second substrates 100 and 200 are pressed against each other so that the first and second substrates 100 and 200 are more firmly bonded (S5).

A light emitting device panel includes the first substrate 100 and the second substrate 200 laminated with the heated gas injected between them. The light emitting device panel is then unloaded out of the vacuum chamber 50 so that the light emitting device panel is exposed to a room temperature environment. Thus, the mobility of the heated gas is reduced and the initial inner pressure is decreased, thereby stably maintaining the laminated first substrate 100 and second substrate 200. The initial inner pressure "P" of the light emitting device panel with a heated gas injected into it varies with the temperature "T" according to the ideal gas equation PV=nRT since the inner volume "V" of the panel is constant.

For example, the ideal gas equation is $P_1V_1$=nR(273+100) when $P_1$ and $V_1$ denote the inner pressure and volume of a light emitting device panel laminated with a nitrogen ($N_2$) gas heated to a temperature of 100° C. Also, the ideal gas equation is $P_2V_2$=nR (273+25) when $P_2$ and $V_2$ denote the inner pressure and volume of the light emitting device panel at a room temperature (25° C.) when the nitrogen gas in the panel has been changed from 100° C. to 25° C.

Thus, $V_1=V_2$ and $P_2=0.8P_1$ since the inner volume of the light emitting device panel is constant. This indicates that the inner pressure of the panel has been reduced by about 20%. For example, the inner pressure between the upper substrate and lower substrate may be about 20 to about 35 torr. Manufacturing a light emitting device panel according to this method increases the reliability and prevents failure of the panel even in high temperature and high humidity environments.

The apparatus for manufacturing light emitting devices according to the embodiment of the present invention does not negatively affect or damage a light emitting device panel even when an inert gas heated to a high temperature is injected into the light emitting device panel. For example, the amount of heat gained by one substrate of the panel at 80° C. is about 1.53 kcal when the specific heat of the substrate is 0.1 kcal/kg ° C., the density is 2.54 g/cm$^3$, and the volume is 109.6 cm$^3$ because the amount of heat required to increase the temperature of the substrate by a specific temperature interval (80° C.–25° C.=55° C.) is the product of the specific heat, mass, and temperature interval of the substrate. The total amount of heat gained by the panel is 3.06 kcal since the panel includes the first substrate 100 and the second substrate 200. A gas of 82 l is required to generate the amount of heat 3.06 kcal at 100° C. since the specific heat of the nitrogen ($N_2$) gas is 0.297 kcal/g ° C. and the molecular mass of nitrogen is 28 g/mol. However, the volume of the general vacuum chamber 50 is 70 l and therefore if the vacuum chamber 50 is filled with the heated gas, the vacuum chamber 50 is then released to the atmospheric pressure so that it is not possible to increase the panel above a specific temperature.

As a result, the apparatus and method for manufacturing light emitting devices according to the embodiment of the present invention does not negatively affect or damage the light emitting device panel even when an inert gas heated to a high temperature is injected into the light emitting device panel.

As is apparent from the above description, the present invention provides an apparatus and method for manufacturing light emitting devices with a variety of features and advantages. For example, a light emitting device panel is laminated after it is filled with a gas heated to a high temperature. Thus, the mobility of the heated gas is reduced while decreasing the initial inner pressure of the panel. The initial inner pressure is decreased when the laminated panel is exposed to room temperature. Thus, failure of the panel is thereby prevented.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method for manufacturing a light emitting device, comprising:

holding a first substrate with a lower chuck located in a vacuum chamber;

holding a second substrate with an upper chuck located opposite the first chuck in the vacuum chamber, wherein one of the first and second substrates includes a light emitting layer;

creating a high vacuum in the vacuum chamber;

aligning positions of the first substrate and the second substrate;

supplying a gas having a temperature of about 50 to about 200° C. into the vacuum chamber;

temporarily laminating the first substrate and the second substrate and filling a predetermined gap between the first and second substrates with the gas having the temperature of about 50 to about 200° C.;

venting the vacuum chamber; and bonding the first substrate and the second substrate.

2. The method of claim 1, wherein the temperature of the vacuum chamber is about 50 to about 90° C.

3. The method of claim 1, wherein the gas is an inert gas.

4. The method of claim 1, wherein supplying the gas occurs simultaneously with temporarily laminating the first substrate and the second substrate.

5. The method of claim 1, wherein the gas is supplied to the vacuum chamber through gas supply holes in the upper chuck.

6. The method of claim 1, wherein temporarily laminating the first substrate and the second substrate includes releasing the second substrate from the upper chuck to allow the second substrate to freely fall on the first substrate.

7. The method of claim 1, wherein a position aligner on the lower chuck aligns positions of the first substrate and the second substrate.

8. The method of claim 1, wherein the high vacuum of the vacuum chamber is $1\times10^{-3}$ torr or less.

* * * * *